(12) United States Patent
Wang et al.

(10) Patent No.: US 8,547,598 B2
(45) Date of Patent: Oct. 1, 2013

(54) POLYGONAL-BOUNDARY-BASED HALFTONE METHOD

(75) Inventors: Shen-ge Wang, Fairport, NY (US);
Edgar A. Bernal, Webster, NY (US);
Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 351 days.

(21) Appl. No.: 13/096,520

(22) Filed: Apr. 28, 2011

(65) Prior Publication Data

US 2012/0274984 A1 Nov. 1, 2012

(51) Int. Cl.
*H04N 1/405* (2006.01)
*G06F 15/00* (2006.01)

(52) U.S. Cl.
USPC ............ 358/3.2; 358/3.06; 358/3.26; 358/1.9

(58) Field of Classification Search
USPC .................................. 358/3.2, 3.06, 3.26, 1.9
See application file for complete search history.

(56) References Cited

U.S. PATENT DOCUMENTS

| 5,155,599 | A | * | 10/1992 | Delabastita | 358/3.07 |
| 5,542,031 | A | * | 7/1996 | Douglass et al. | 358/1.15 |
| 2006/0279787 | A1 | * | 12/2006 | Li et al. | 358/3.2 |

* cited by examiner

*Primary Examiner* — Charlotte M Baker
(74) *Attorney, Agent, or Firm* — Fay Sharpe LLP

(57) ABSTRACT

As set forth herein, computer-implemented methods and systems facilitate halftoning using boundaries and centers of a polygonal tiling with a parameterized spot function that operates within the tiles. Defining the halftone structure includes defining the polygonal tiling with a specification of the polygon boundaries and center, and setting and applying parameters of the spot function, which utilizes center-to-boundary distances. The tiling can be defined explicitly, by defining a tile structure, or providing centers, one per polygon, and vertices for the polygons. The vertices and centers are used to generate the polygon boundaries. The polygonal tiling can be regular (e.g., repetitive) or irregular, and can also be varied in a manner adapted to the image content or to data that is being embedded.

25 Claims, 10 Drawing Sheets
(1 of 10 Drawing Sheet(s) Filed in Color)

POLYGONAL-BOUNDARY-BASED HALFTONE METHOD

TECHNICAL FIELD

The presently disclosed embodiments are directed toward methods and systems for printing, reproducing or displaying images. More particularly, the teachings disclosed herein are applicable to methods and apparatuses wherein clustered-dot halftoning is implemented.

BACKGROUND

Digital images may be formatted as contone (continuous tone) images having a wide range of tonal values or may be formatted as coarsely quantized images having a limited number of tonal values, such as two levels for a binary image. Digital halftoning is a process of transforming a contone image to a coarsely quantized image. Digital halftoning is an important step in printing or displaying digital images possessing contone color tones because most printing processes are operating in a binary mode. Examples of such marking processes are offset printing presses, xerography, and ink-jet printing. In these processes, for each color separation of an image, a corresponding colorant spot is either printed or not printed at any specified image location, or pixel. Digital halftoning controls the printing of color dots formed by combinations of colorant spots of a colorant set, where the spatial averaging of the printed colorant dots, such as by the human visual system, provides the illusion of the required continuous tones.

Digital images and the resulting prints are formed of one or more colorant separations, also referred to as "color separations." A monochrome image is formed of one colorant separation, typically black. Process color images are typically constructed of cyan, magenta, yellow, and black separations. Duotone and tritone images are formed of two and three separations, respectively. Spot color images have multiple colorant separations, where at least one colorant is positioned spatially non-overlapping with other colorants. Extended colorant set images typically include the process-color colorant separations plus one or more additional colorant separations such as green, orange, violet, red, blue, white, varnish, light cyan, light magenta, gray, dark yellow, metallics, and so forth. In the present teachings, we will use the terms "color images", "color dots", "color spots", "colorant" and similar language to refer to images and marking systems with any number of colorants. The teachings herein apply particularly to any individual color separation of a digital image and resulting print, where that digital image or print can be composed of one or more separations. With the advent of computers, it is desirable for graphic artists and others to manipulate contone images and print them as halftone images. However, typical computer printers and typesetters are incapable of printing individual halftone dots in an infinite number of sizes. Instead, each halftone dot of a printed picture is in turn comprised of a collection of discrete, smaller "spots" or "pixels", which are generally the smallest marks a printer or typesetter can make.

A common halftone technique is called screening, which compares the required continuous color tone level of each pixel for each color separation with one or more predetermined threshold levels. The predetermined threshold levels are typically defined for halftone cells that are tiled to fill the plane of an image, thereby forming a halftone screen of threshold values. At a given pixel, if the required color tone level is greater than the halftone threshold level for that pixel, a "1" is generated in the halftone output, so that a colorant spot is printed at that specified pixel in the subsequent printing operation. If the required color tone at a given pixel is less than the halftone threshold level for that pixel, a "0" is generated in the halftone output, so that a colorant spot is not printed at that specified pixel in the subsequent printing operation. The output of the screening process is a binary pattern that controls the printing of multiple small spots or pixels that are printed. The printed spots can be grouped or "clustered" to form print structures that are relatively stable for a given printing process. We refer to these clusters as "clustered-dots" or "dots", and they are regularly spaced as determined by the size, shape, and tiling of the halftone cell. Conventional periodic halftone screens and halftone screen outputs can be considered as two-dimensional repeated patterns, possessing two fundamental spatial frequencies, which are completely defined by the geometry of the halftone screens.

In this manner, a "digital screen" is created as an array of cells with pixels having threshold values. Each pixel has a set position and a set threshold value within the cell. Likewise, each cell has a set position within the digital screen. To create a halftone image, a contone image is broken down into an array of pixel-sized samples, and the gray level of each contone sample is stored. Next, each contone sample is compared with the halftone threshold value of the corresponding pixel in the halftone screen, and the pixel is darkened in the subsequent print image if the gray level of the contone sample is greater than the threshold value for that pixel. All the pixels of the digital screen are at set positions with respect to one another, such that a contone sample from the "top-left" of the picture would be compared with a pixel at the "top-left" of the digital screen. In other words, each digital screen pixel has a position which corresponds with and is associated with a position on the original contone picture.

Halftoning attempts to render images to printable form while avoiding unwanted visual texture, known as moiré, and tone reproduction irregularities. The two key aspects of halftone screen design are the geometry of periodic dot placement and the shape of the halftone dots. Controlling halftone dot shape has been a lower priority in laser printers because printer pixel resolution, typically measured in rasters per inch referring to the number of smallest printable spots per unit length, has been too low. Consider, for example, the task of controlling dot shape of a 212 cell per inch (cpi) 45° halftone screen used with a printer having a resolution of 600 rasters/inch, where the halftone cell is only two rasters in height. As laser printing resolutions reach 2400 rasters/inch, and greater, controlling halftone dot shape provides a greater impact in improving a printed image.

As pixel resolution has increased with advancements in processor speed, memory capacity, printer and/or display capability, and the like, new options in halftone geometry have arisen. One area of development has been the so-called $2^{nd}$ generation stochastic screens, watermarking, security printing, data embedding, and novelty printing. However, conventional methods provide only for simple tiling (rectangular, parallelogram) or Voronoi tiling, and simple shapes (e.g., circle, square, ellipse, line, diamond).

One class of methods of growing these dots operates in the frequency domain. These "green noise"-like methods adjust a frequency spectrum while neglecting fundamental design principles relating to dot shape and touching.

A second class of $2^{nd}$ generation stochastic screens uses random seeds, then applies a fixed threshold array to control growth around the seeds. While these methods attempt to control growth in the spatial domain, where better control is possible, a fixed threshold array on random seeds tends to produce high graininess and poor touch points.

A third class attempts to use parameters to control the growth within a Voronoi tessellation formalism. These methods seem to be using a sound strategy of defining a spatial tessellation and attempting to control growth and touching between the tiles for the purposes of print-to-print stability and uniformity. But, the growth control seems to be quite suboptimal, offering much less control than is available for growing periodic dots. The lack of control not only affects stability and uniformity, but does not allow dot shaping for aesthetic purposes, such as using rounder dots for faces, squarer sharper dots for graphics, extended highlight dots (avoid touching until into the shadows) and extended shadow dots (which touch early and focus on hole shape).

There is a need in the art for systems and methods that provide a variety of controllable tiling configurations and controllable dot shapes while overcoming the aforementioned deficiencies.

BRIEF DESCRIPTION

In one aspect, a computer-implemented method for generating a halftone image using a spot function on pixels within a polygonal tiling comprises defining polygon boundaries and centers within an input pixel array, generating a triangle tessellation from the defined polygon centers, and polygon vertices, and identifying encompassing triangles, which each encompasses at least one pixel. The method further comprises determining distances including a triangle height H and a pixel height h from a given pixel to a non-center side of the encompassing triangle in which the pixel is located, then for each pixel evaluating the spot function using the determined distances to generate an output spot function value for each pixel, and generating a halftone image using the output spot function values.

In another aspect, a system that facilitates generating a halftone image using a spot function on pixels within a polygonal tiling comprises a processor configured to define polygon boundaries and centers within an input pixel array, generate a triangle tessellation from the defined polygon centers, and polygon vertices, and identify encompassing triangles, which each encompasses at least one pixel. The processor is further configured to determine distances comprising a triangle height H and a pixel height h from a given pixel to a non-center side of the encompassing triangle in which the pixel is located, then for each pixel evaluate the spot function using the determined distances to generate an output spot function value for each pixel, and generate a halftone image using the output spot function values. Additionally, the system comprises a printer that prints a halftone image using the output spot function values.

In yet another aspect, a computer-implemented method for generating a halftone image using a spot function on pixels within a polygonal tiling comprises defining polygon boundaries and centers within an input pixel array, tessellating a set of input points in each of the defined polygons in the input pixel array, and identifying encompassing triangles each of which encompasses at least one pixel. The method further comprises determining distances comprising a triangle height H and a pixel height h from each pixel to a non-center side of the encompassing triangle in which the pixel is located, normalizing the determined distances, and, for each pixel, executing the spot function using the normalized distances to generate an output spot function value for each pixel. Additionally, the method comprises generating a halftone image using the output spot function values and image pixel values for each pixel, and printing the halftone image.

According to another aspect, a computer-implemented method for generating a halftone image using a spot function on pixels within a polygonal tiling comprises defining polygon boundaries and centers within an input pixel array, generating a triangle tessellation from the defined polygon centers, and polygon vertices, and identifying encompassing triangles, which each encompass at least one pixel. The method further comprises determining distances comprising a first triangle height $H_1$ and a first pixel height $h_1$ from a given pixel to a first center side of the encompassing triangle in which the pixel is located, and a second triangle height $H_2$ and a second pixel height $h_2$ from the given pixel to a second center side of the encompassing triangle, and for each pixel, evaluating the spot function using the determined distances to generate an output spot function value for each pixel. Additionally, the method comprises generating a halftone image using the output spot function values, wherein the spot function is defined as:

$$Q = -(a_1 \cos(\pi(2h_1/H_1)^{\gamma_1}) + a_2 \cos(\pi(2h_2/H_2)^{\gamma_2})),$$

where $a_1$, $a_2$ are adjustable parameters that vary a rate of growth of a dot formed at least in part by the at least one pixel, and where $\gamma_1$ and $\gamma_2$ are adjustable values that control the roundness of dot sides and the sharpness of corner touch points of a dot formed at least in part by the given pixel.

BRIEF DESCRIPTION OF THE DRAWINGS

The file of this patent contains at least one drawing executed in color. Copies of this patent with color drawing(s) will be provided by the U.S. Patent and Trademark Office upon request and payment of the necessary fee.

DETAILED DESCRIPTION

The above-described problem is solved by providing a halftoning method that uses boundaries and centers of a polygonal tiling with a parameterized spot function that operates within the tiles. In general, the steps involved in defining the halftone structure include defining the polygonal tiling with a specification of the polygon boundaries and center, and setting and applying parameters of the spot function, which utilizes center-to-boundary distances. The tiling can be defined in one of several ways, such as explicitly defining a tile structure, or providing centers, one per polygon, and vertices for the polygons. The vertices and centers can be used to generate the polygon boundaries. The polygonal tiling can be regular (e.g., repetitive) or irregular, and can also be varied in a manner adapted to the image content or to data that is being embedded. Various definitions of polygon center may be used. The spot function is based on triangulation of the polygons and center-to-boundary distances rather than on distances from a center alone, which allows for greater control over shape and overall appearance of the printed tiled halftone. The spot function also includes parameters that facilitate controlling the sharpness and slope of the spot function. In one embodiment, pre-generated input seeds are provided and the polygon vertices and/or boundaries are calculated therefrom. In another embodiment, boundaries and/or vertices are known or provided, and the seed points are calculated therefrom. In yet another embodiment, seed points, and one or more of boundaries and vertices are provided or known a priori.

Figure 1:
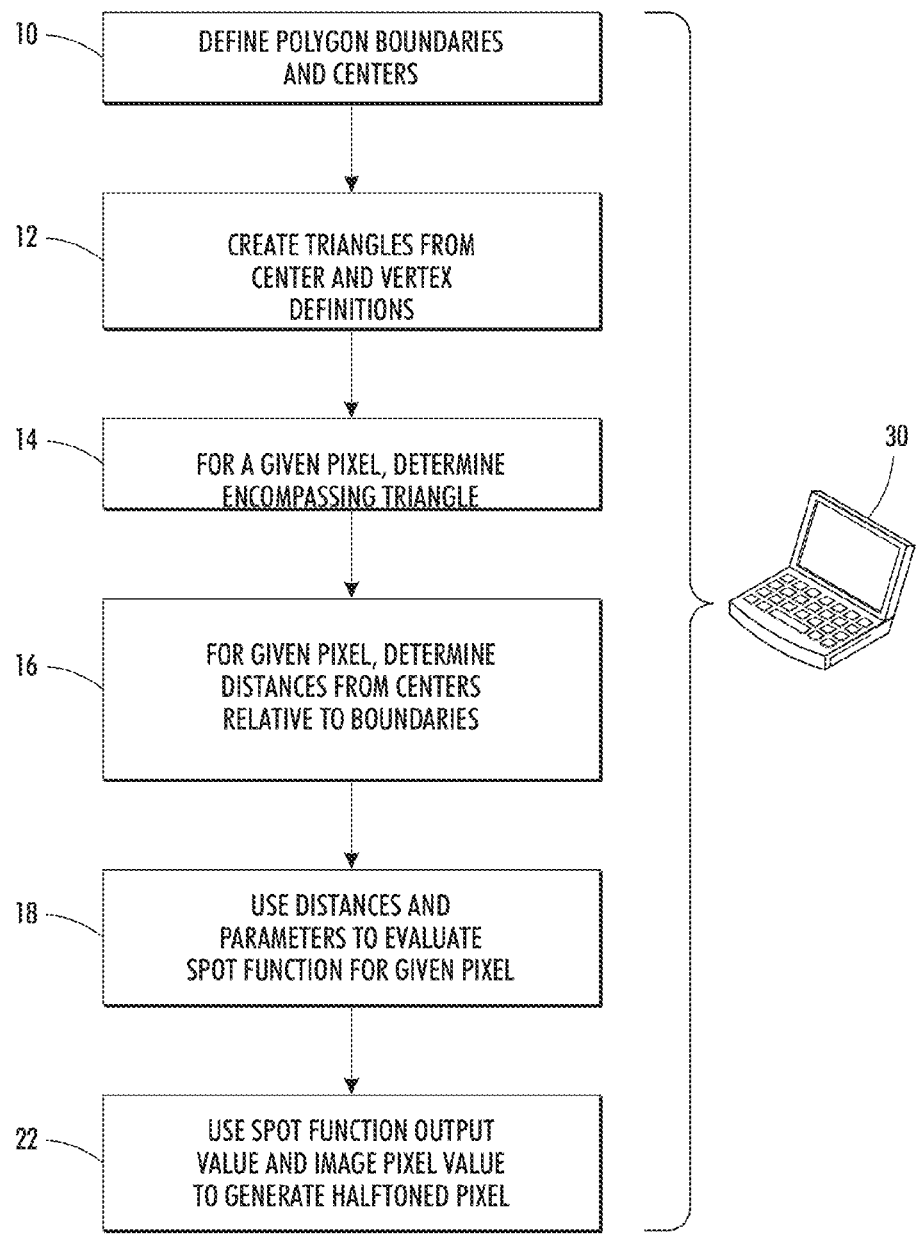
FIG. 1 illustrates a method of generating a halftone image using a spot function on pixels within a polygonal tiling, in accordance with one or more aspects described herein.

FIG. 1 illustrates a method of generating a halftone image using a spot function on pixels within a polygonal tiling, in accordance with one or more aspects described herein. At 10, polygon centers and boundaries are defined within an input pixel array. The input pixel array may be irregular and comprises points or "seeds" (centers and vertex pixels or points) and is received or generated from an initial source, such as a stochastic screen, or by randomly perturbing locations of seeds arranged in a regular grid, or the like. Stochastic screening is a halftone process that employs a pseudo-random distribution of halftone dots and uses frequency modulation (FM) to adjust dot density to achieve a desired gray level. In another embodiment, the input pixel array is regular or periodic. That is, the seeds can be locations on a regular grid, or irregular (random) locations as used for $2^{nd}$ generation stochastic screens. The seeds can be defined as activated ("on") pixels on a pixel grid, or they can be represented as general spatial coordinates. In one embodiment, the seeds are generated as activated pixels using a stochastic screen halftone up to a target gray level, e.g., 15% area coverage or some other desired gray level, and the spot function grows each halftone dot about its respective seed. In optimizing the stochastic screen used for the seeds, a reduced range of frequency modulation (FM) use (e.g., 0 to 15% area coverage or some other desired range) can be employed, rather than for the full gray range as in conventional practices. When using the described method to generate a halftone cell, the cell can be treated as a hypertile so that seed distribution is not disturbed near the boundary. The periodic seeds can be arranged on a rectangular or hexagonal grid, or can be more complex, where simple grids may be sheared, elongated or combined.

At 12, triangles are generated from the defined centers and boundaries. At 14, for each pixel, an encompassing triangle is determined or identified. It will be appreciated that the step of determining encompassing triangles may optionally be omitted for seed points that lie on a pixel as opposed seed points that have a spatial coordinate not necessarily congruent with a pixel grid in which the pixels lie. That is, there is not a need to determine the encompassing triangle of a pixel if the pixel is located on a vertex of one or more triangle(s).

At 16, for each pixel, distances from the centers of the encompassing triangles are determined relative to the defined boundaries. At 18, the distances and other parameters of the spot function are used to evaluate and/or execute a spot function for each pixel. At 20, a spot function output value for each pixel is used along with an image pixel value (i.e., a value indicative of one or more of pixel brightness, color, etc.) to generate a halftoned pixel value.

It will be appreciated that the method of FIG. 1 can be implemented by a computer 30, which comprises a processor (such as the processor 104 of FIG. 12) that executes, and a memory (such as the memory 106 of FIG. 12) that stores, computer-executable instructions for providing the various functions, etc., described herein.

The computer 30 can be employed as one possible hardware configuration to support the systems and methods described herein. It is to be appreciated that although a standalone architecture is illustrated, that any suitable computing environment can be employed in accordance with the present embodiments. For example, computing architectures including, but not limited to, stand alone, multiprocessor, distributed, client/server, minicomputer, mainframe, supercomputer, digital and analog can be employed in accordance with the present embodiment.

The computer 30 can include a processing unit (see, e.g., FIG. 12), a system memory (see, e.g., FIG. 12), and a system bus (not shown) that couples various system components including the system memory to the processing unit. The processing unit can be any of various commercially available processors. Dual microprocessors and other multi-processor architectures also can be used as the processing unit.

The computer 30 typically includes at least some form of computer readable media. Computer readable media can be any available media that can be accessed by the computer. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above can also be included within the scope of computer readable media.

A user may enter commands and information into the computer through an input device (not shown) such as a keyboard, a pointing device, such as a mouse, stylus, voice input, or graphical tablet. The computer 30 can operate in a networked environment using logical and/or physical connections to one or more remote computers, such as a remote computer(s). The logical connections depicted include a local area network (LAN) and a wide area network (WAN). Such networking environments are commonplace in offices, enterprise-wide computer networks, intranets and the Internet.

Several techniques are described herein for defining the boundaries and centers of the polygonal tiles, at step 10. According to one example, centers are defined given polygon boundaries and/or vertices. For instance, boundaries may be provided in various forms, such as a definition of repeat patterns, which may be preferred if a periodic tiling is desired. According to another example, a boundary may be defined to include a collection of vertices and a collection of line segments. Given a boundary, the center of a polygon can be defined in one of multiple ways. A strict definition from plane geometry may be employed, or a position that is perturbed from a classically defined center may be used. The canons of plane geometry dictate that all polygons have at least one definition of a center, which is the centroid, and triangles have the following centers: an "incenter," where the three angle bisectors meet; a "circumventer," where the three perpendicular bisectors of the sides of a triangle meet; a "centroid," where the three medians (the lines drawn from the vertices to the bisectors of the opposite sides) meet, also called a center of mass or center of gravity; and an "orthocenter," where the three altitudes of a triangle meet. In defining a center, a location in a plane or a pixel index may be used.

For a general polygon, the centroid can be determined as follows. For a polygon with N vertices $(x_i, y_i)$, where $(x_0, y_0) = (x_N, y_N)$, the area A is given by:

$$A = \frac{1}{2} \sum_{i=0}^{N-1} (x_i y_{i+1} - x_{i+1} y_i) \quad (1)$$

The centroid $(c_x, c_y)$ is given by:

$$c_x = \frac{1}{6A} \sum_{i=0}^{N-1} (x_i + x_{i+1})(x_i y_{i+1} - x_{i+1} y_i) \quad (2)$$

$$c_y = \frac{1}{6A} \sum_{i=0}^{N-1} (y_i + y_{i+1})(x_i y_{i+1} - x_{i+1} y_i) \quad (3)$$

According to another example, when defining polygon boundaries and centers at step 10, boundaries and vertices are defined given centers. For instance, given a collection of centers, polygons of a chosen order can be defined about those centers to form polygonal tessellations. The definition of the polygons about the centers can be derived as vertices or boundaries. The centers can be in a variety of spatial configurations, such as a simple 2-D periodic lattice, a more complex periodic lattice, or random, etc. From these definitions, tessellation, tiling, and/or mesh generation techniques can be implemented.

Figure 2A:
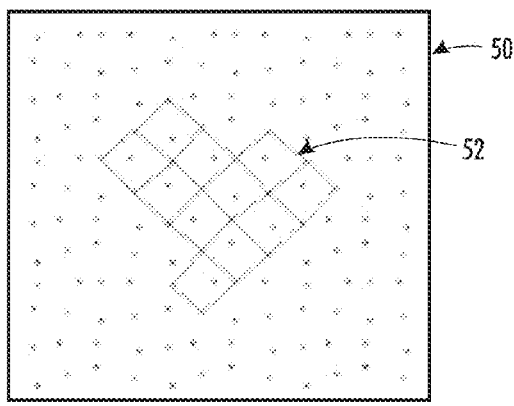
FIGS. 2A-2C illustrate examples of boundary and vertex definition using random centers in an input pixel array.
Figure 2B:
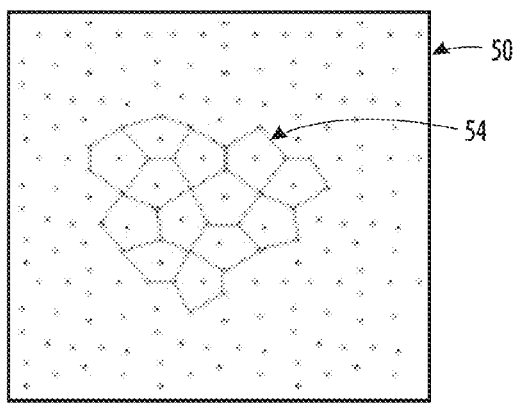
Figure 2C:
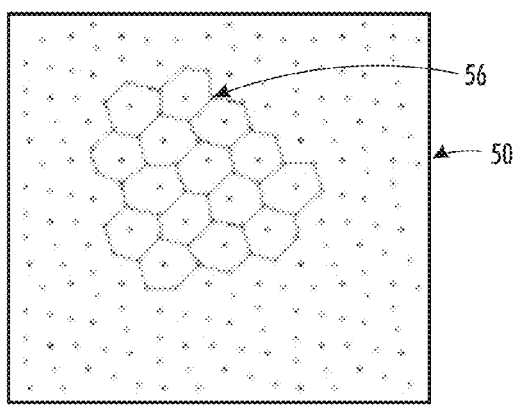

FIGS. 2A-2C illustrate examples of boundary and vertex definition using random centers in an irregular input pixel array 50, such as may be performed at step 10 of FIG. 1. In these examples, common random centers are used to derive vertices for quadrilaterals 52 (FIG. 2A), pentagons 54 (FIG. 2B), and hexagons 56 (FIG. 2C). The centers are shown as black dots and the vertices and boundaries are shown in red. To define the boundaries of a quadrilateral tessellation as shown in FIG. 2A, one approach generates or identifies vertices from four neighboring centers. The four neighboring centers form an intermediate quadrilateral. The diagonal center (intersection of diagonals) can be used as a vertex of a quadrilateral boundary in the tessellation. To define boundaries for pentagonal (FIG. 2B) and hexagonal (FIG. 2C) tiling, line segments are identified that are equidistant between five and six neighboring centers, respectively. Intersections of the line segments give the vertices and the segments between the vertices are the boundaries. The described method may thus be considered a form of Voronoi tessellation.

Referring back to FIG. 1, to define a triangle tessellation for each polygon and determine triangle parameters at 12, a triangle tessellation is generated for each polygon, where each triangle has a center point and two boundary points for its three vertices. It is assumed that only one center point is in the polygon, and a simple radial sweep technique can be used to generate the tessellation, in which the central point of the set is connected to other points radially. Triangles are then formed by connecting radial edges together.

More complex triangulation methods may be used when centers and boundary vertices are provided that result in more than one center within a polygon. Parameters such as height, normalized height, etc., are determined for each triangle. In one example, the height H from the center point vertex to the opposite side (i.e., a "non-center" side) of the triangle is used.

Several manners of identifying or determining the encompassing triangles at 14 are contemplated. For instance, the encompassing triangles can be identified using a crossing number technique, which follows a ray that passes through the point P and finds the triangle whose sides intersect the ray twice, once on each side of the point. In another example, a winding number technique is employed, which counts the number of times the triangle winds around the point or seed. If the winding number is 0, the point is outside the triangle; otherwise, it is inside.

Figure 3:
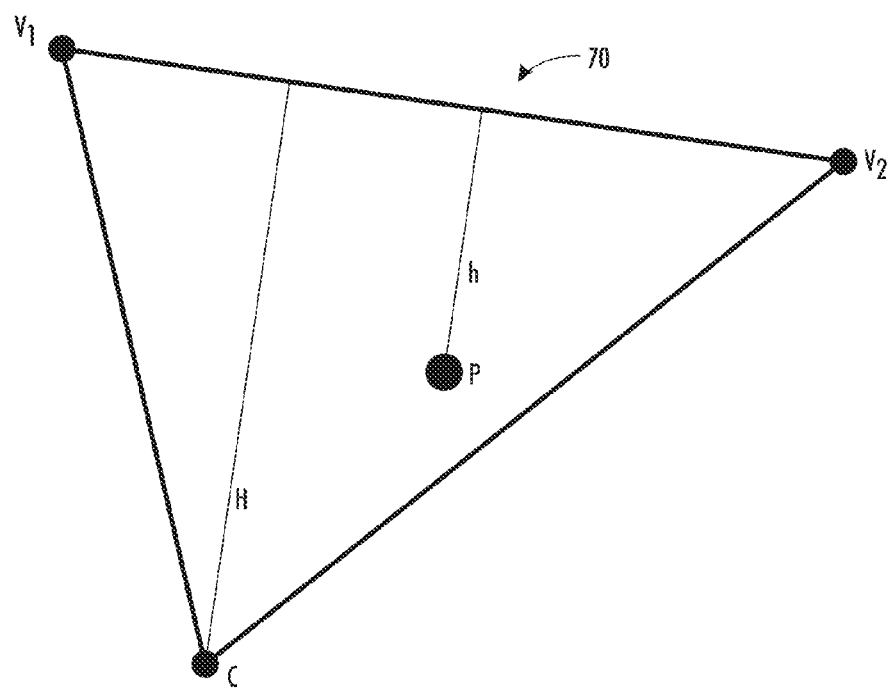
FIG. 3 illustrates a triangle with a schematic representation of distances such as can be employed to generate or identify distance from center relative to boundaries for each pixel.

FIG. 3 illustrates triangle 70 with a schematic representation of distances such as can be employed to generate or identify distance from center C relative to boundaries for each pixel at step 16 of FIG. 1. With reference to FIG. 3 and with continued reference to FIG. 1, once the triangle $CV_1V_2$ containing a non-center pixel P is found, a distance h is determined, which is the distance between the pixel P and the base or non-center side $V_1V_2$ (i.e., the side opposite the center C) of the triangle connecting the two boundary vertex points $V_1$ and $V_2$, as shown in FIG. 3. Thus, two height values are generated or determined, including a triangle height H and a pixel height h, wherein the base or non-center side $V_1V_2$ of the triangle has a height H that represents a distance from the non-center side to the vertex or center C opposite the non-center side, and a pixel height h that represents a distance from the non-center side to the pixel P.

With continued reference to FIGS. 1-3, using the two height values, and optionally one or more additional parameters, the spot function is evaluated and/or executed for each pixel P, at step 18, to generate a spot function output value for each pixel. That is, once both height values H, h have been computed, a Q value (an output value) of the given pixel is computed according to the following formula:

$$Q = af(h/H) \quad (4)$$

where f is a suitably chosen monotonically decreasing function that controls the rate of growth along the direction of the altitude of the triangle (or other polygon) and a is a parameter that can be adjusted to change the rate of growth of the dot. For example, $f(h/H) = 1 - h/H$ or $f(h/H) = \cos(\pi(1-h/H))$, etc.

In another embodiment, other heights $H_1$, $h_1$ and $H_2$, $h_2$ are optionally calculated (e.g., heights H, h from sides $CV_1$ and/ or $CV_2$ respectively). This optional step enables finer control of spot growth. For example, when $$Q=-(a_1\cos(\pi(2h_1/H_1)^{\gamma_1})+a_2\cos(\pi(2h_2/H_2)^{\gamma_2})) \quad (5)$$

the values of the parameters $\gamma_1$ and $\gamma_2$ can be adjusted to control the roundness of the dot sides and the sharpness of the corner touch points. Specifically, when $\gamma_i<1$, a pincushion effect is achieved, which can improve stability in some marking processes. When $\gamma_i>1$, the generated dots are generally rounder and delay contact at corners, which may be preferred for some marking processes or used for subject matter that is primarily highlights.

With regard to step 20 of FIG. 1, the output spot function value Q and an additional parameter such as an image pixel value is employed to generate a halftoned pixel. The spot function itself can be used to halftone an image, or a sampled version of the spot function can be applied as a threshold array for efficient implementation in a printer. Optionally, data normalization can be performed with the spot function. Once all pixels in the matrix are processed, the resulting entries are shifted and scaled to fit the data range, such as [0,255] for an 8-bit system or [0,1023] for a 10-bit image path.

According to another embodiment, where the spot function has identical or nearly identical values for multiple pixels in a dot, their order can be determined by any of a number of secondary considerations or parameters. For, instance a marking process or imager can mark pixels in a consistent manner if pixels are preferentially added to a side, such as the lead edge, or trail edge of the dot as it moves through the process or start-of-scan or end-of-scan aide of a dot relative to a laser imager scanning direction. In another embodiment, angular considerations are used to rank pixels. For instance, to have minimal displacement of the centroid of the dot from gray level to gray level, pixels with nearly identical dot shape function values are sometimes selected by spiraling around the dot in quadrant (or hextant, . . . ) steps. As another example, printed dot consistency can be achieved by preferentially growing a dot in a vertical or horizontal direction where pixels having nearly identical dot shape function values are ranked to provide more growth in the preferred direction. In some cases, the fill order for pixels of nearly identical dot shape function values can be random, or selected by any of a number of other criteria.

FIGS. 4-9 illustrate various examples of halftone images generated using the described spot functions.

Figure 4:
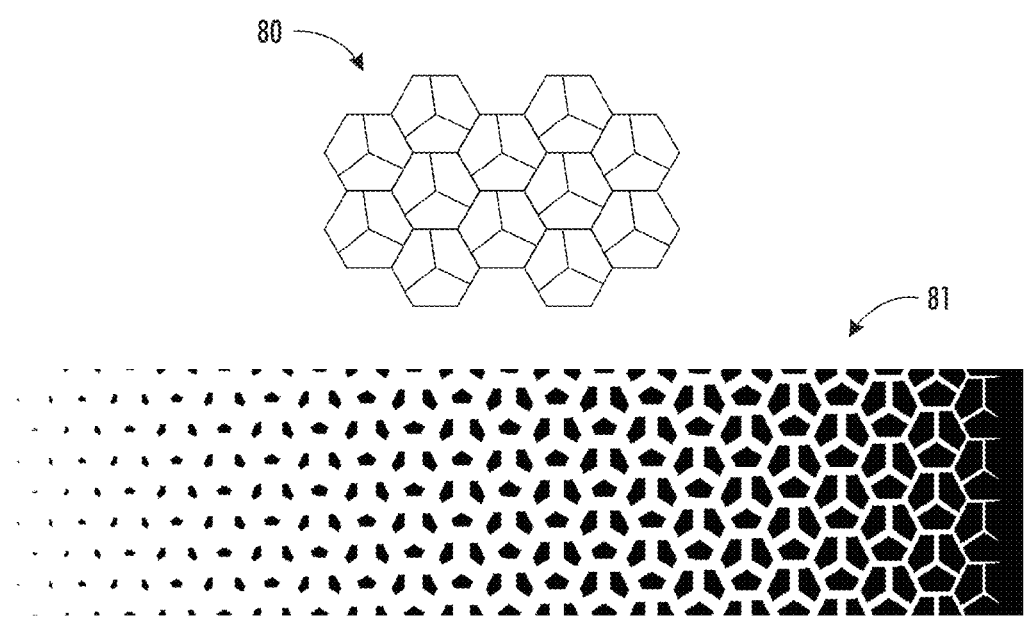
FIG. 4 illustrates a pentagonal tiling, such as may be generated using the described technique(s), and a pentagonal halftone image generated using the described spot function with the pentagonal tiling.

FIG. 4 illustrates a pentagonal tiling 80, such as may be generated using the described technique(s) and as shown in FIG. 2B, and a pentagonal halftone image 81 generated using the described spot function with the pentagonal tiling 80. Tiling, or tessellation, of a plane denotes a collection of plane figures that fills the plane with no overlaps and no gaps. Various definitions of a polygon center may be used. The polygons are assumed to be simple (non self-intersecting).

Figure 5:
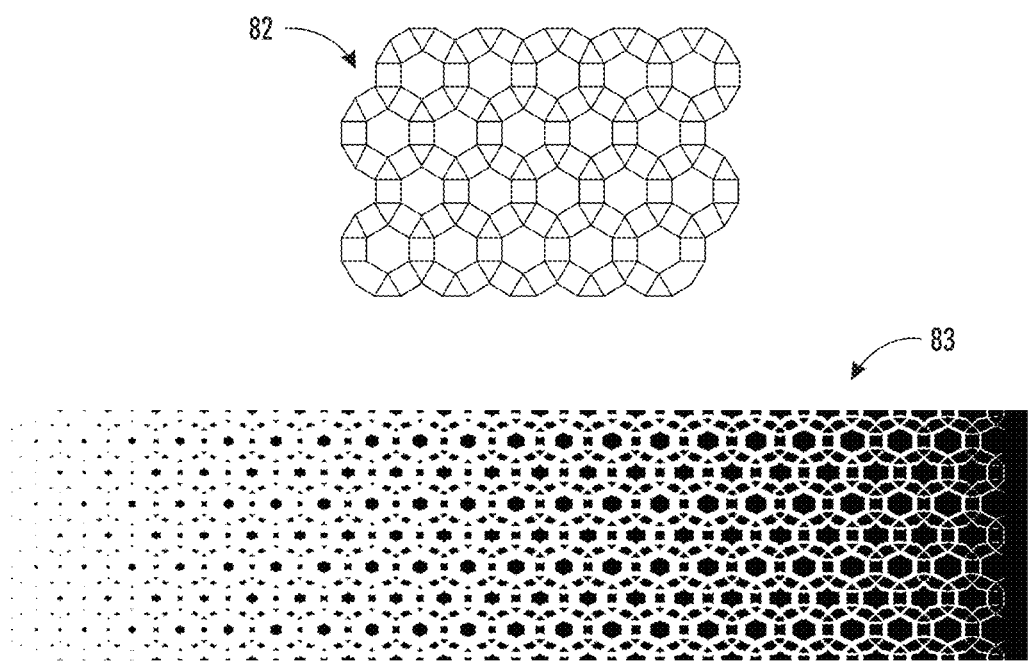
FIG. 5 illustrates an example of a tiling with hexagons, squares and triangles, and a corresponding halftone generated using the herein described techniques.

FIG. 5 illustrates an example of a tiling 82 with hexagons, squares and triangles, and a corresponding halftone 83 generated using the herein described techniques.

Figure 6:
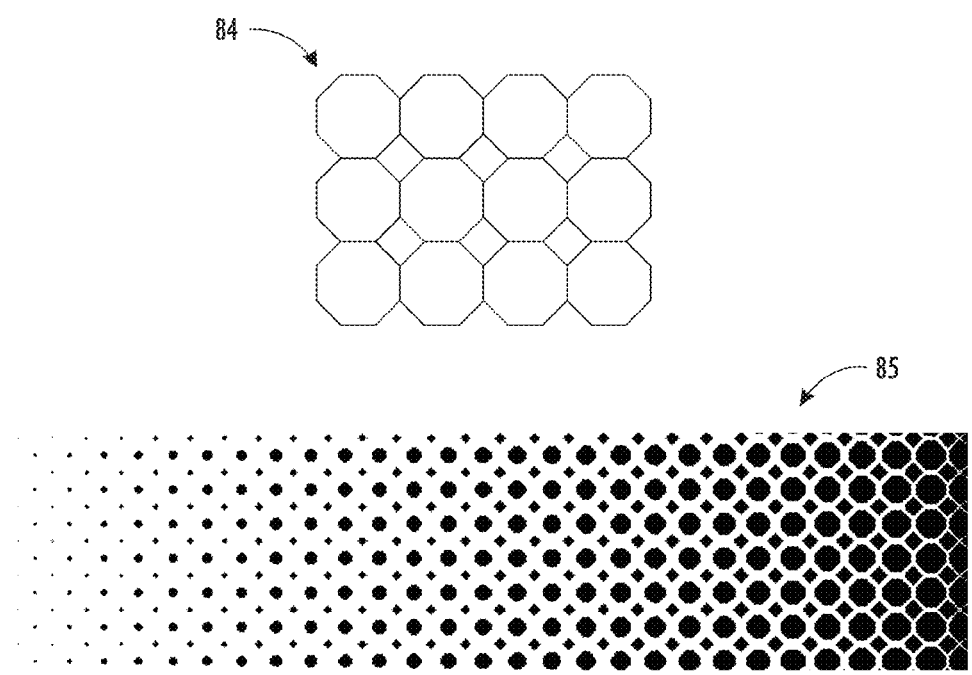
FIG. 6 illustrates an example of a tiling with octagons and squares, and a corresponding halftone generated using the herein described techniques.

FIG. 6 illustrates an example of a tiling 84 with octagons and squares, and a corresponding halftone 85 generated using the herein described techniques.

Figure 7:
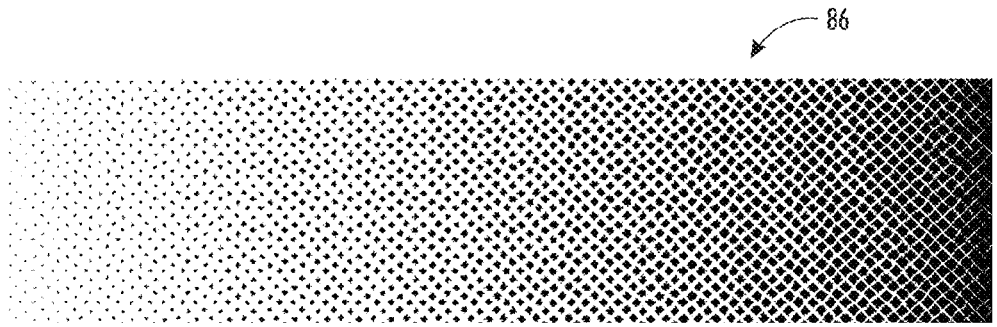
FIG. 7 illustrates an example of a quadrilateral halftone constructed from stochastic centers using the herein described techniques.

FIG. 7 illustrates an example of a quadrilateral halftone 86 constructed from stochastic centers using the herein described techniques.

Figure 8:
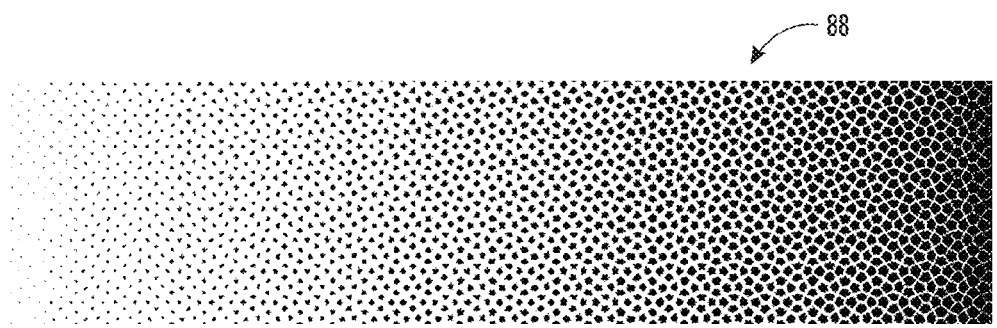
FIG. 8 illustrates an example of a pentagonal halftone constructed from stochastic centers using the herein described techniques.

FIG. 8 illustrates an example of a pentagonal halftone 88 constructed from stochastic centers using the herein described techniques.

Figure 9:
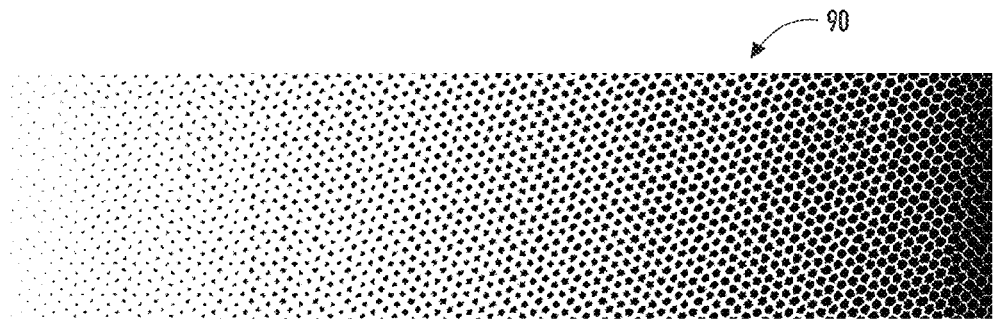
FIG. 9 illustrates an example of a hexagonal halftone constructed from stochastic centers using the herein described techniques.

FIG. 9 illustrates an example of a hexagonal halftone 90 constructed from stochastic centers using the herein described techniques.

Figure 10A:
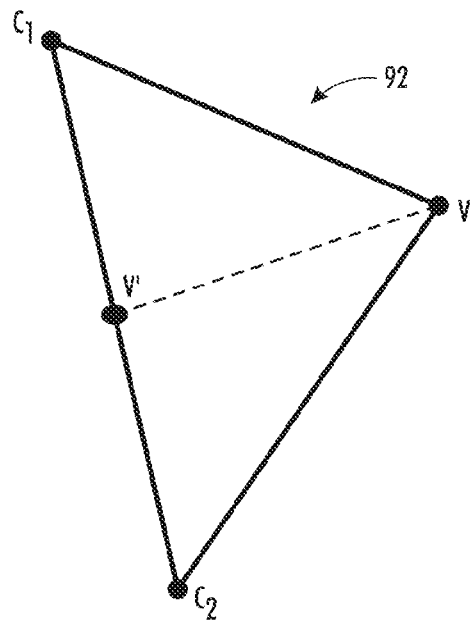
FIGS. 10A-10B illustrate examples of a modified tessellation approach.
Figure 10B:
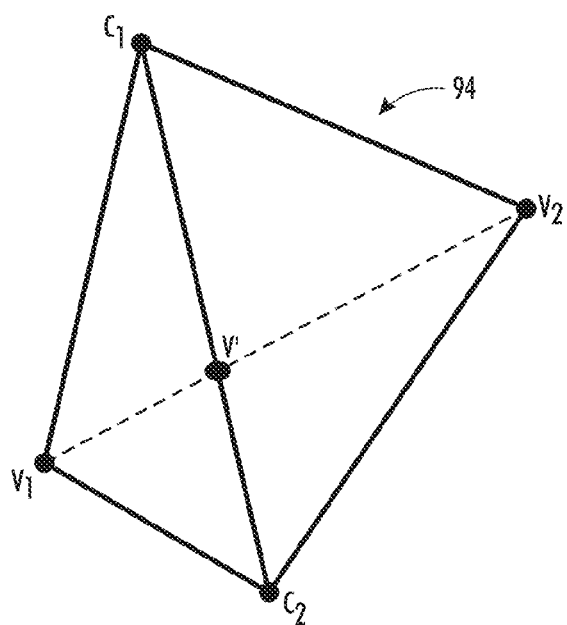

FIGS. 10A-10B illustrate examples of a modified tessellation approach relative to the one described with regard to FIG. 3. In the triangle 70 of FIG. 3, each triangle has exactly one center point as a vertex (the remaining two vertices are boundary points). Every triangle that does not satisfy this condition falls in one of three categories. A first category includes triangles in which one or more of the vertices of the triangle are center points. A second category includes triangles in which two vertices of the triangle are center points $C_1$, $C_2$ and the third vertex V is a boundary point.

There are two cases to consider in the second category. First, if the line segment connecting the two center points is a side of only one triangle, then a boundary point V' is added at the mid-point along that segment and the triangle is sub-divided into two smaller triangles, each having the new boundary point V', the old common boundary point V and one of the two original center points $C_1$, $C_2$ as vertices, as illustrated by the triangle 92 of FIG. 10A. Second, if the line segment connecting the two center points $C_1$, $C_2$ is a side of two triangles, each having exactly two center points $C_1$, $C_2$ as vertices, then the boundary point $V_2$ that is the vertex of the second triangle sharing the side connecting the two center points is determined or identified. A boundary point V' is added along the intersection of the segments that join the two center points $C_1$, $C_2$ and the two boundary points $V_1$, $V_2$. The two triangles are thus sub-divided into four triangles, each having one center point, one original boundary point $V_1$, $V_2$, and the one new boundary point V' as vertices as illustrated by the dual-triangle configuration 94 of FIG. 10B.

Figure 11:
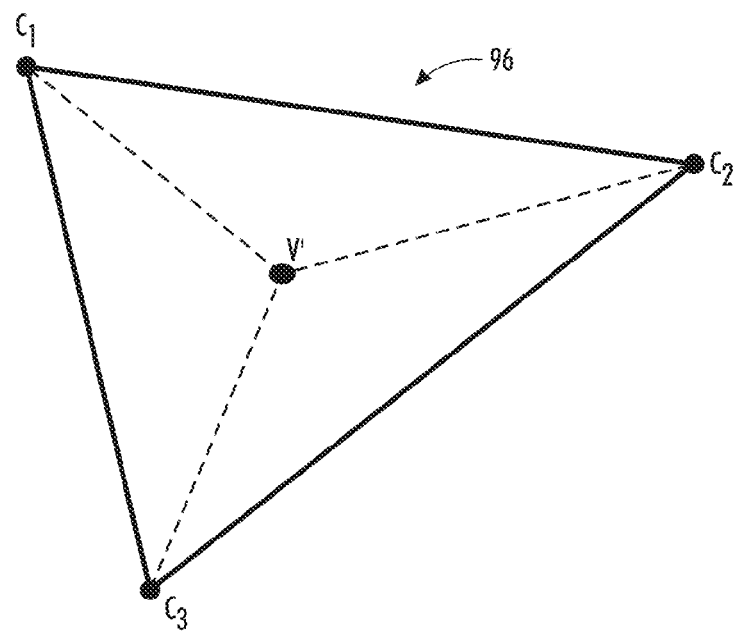
FIG. 11 illustrates a triangle representative of the third category of triangles that do not satisfy the single-center-vertex condition, in which all three vertices of the triangle 6 are centers.

FIG. 11 illustrates a triangle 96 representative of the third category of triangles that do not satisfy the single-center-vertex condition, in which all three vertices $C_1$, $C_2$, $C_3$ of the triangle 96 are center points. In this case, a new boundary point V' is added in the interior of the triangle 96 and the triangle is sub-divided into three smaller triangles as indicated by the dashed lines. Each of the resulting triangles has two center points and one boundary point V' as vertices. This procedure is iterated until each triangle has a single center point as a vertex, the other two vertices being boundary points. Once the new triangulation satisfies the condition that each triangle has exactly one center point as a vertex, triangle parameters, such as the triangle height H and pixel height h (for each pixel in an encompassing triangle) as described herein, are determined for each triangle.

Figure 12:
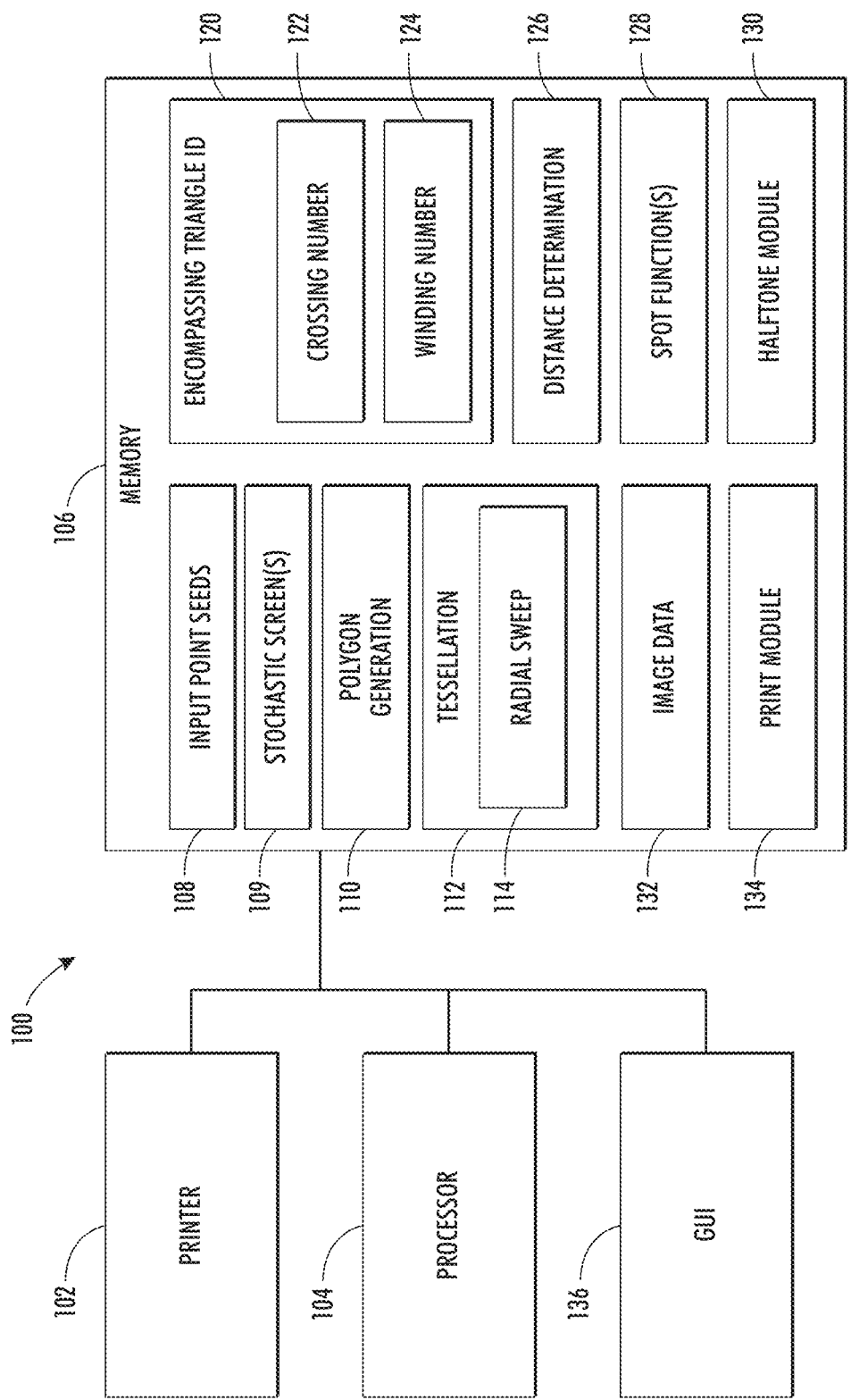
FIG. 12 illustrates a system that facilitates generating a halftone image by employing a spot function based on polygonal tessellation.

FIG. 12 illustrates a system 100 that facilitates generating a halftone image by employing a spot function based on polygonal tessellation. The system comprises a print engine 102 that is coupled to a processor 104 that executes, and a memory 106 that stores computer-executable instructions for performing the various functions, methods, techniques, steps, and the like described herein. The processor 104 and memory 106 may be integral to each other or remote but operably coupled to each other. In another embodiment, the processor 104 and memory 106 are integral to the printer 102. In another embodiment, the processor and memory reside in a computer (e.g., the computer 30 of FIG. 1) that is operably coupled to the printer 102.

As stated above, the system 100 comprises the processor 104 that executes, and the memory 106 that stores one or more computer-executable modules (e.g., programs, computer-executable instructions, etc.) for performing the various functions, methods, procedures, etc., described herein. Additionally, "module," as used herein, denotes a set of computer-executable instructions, software code, program, routine, or other computer-executable means for performing the described function, or the like, as will be understood by those of skill in the art. Additionally, or alternatively, one or more of the functions described with regard to the modules herein may be performed manually.

The memory may be a computer-readable medium on which a control program is stored, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, RAM, ROM, PROM, EPROM, FLASH-EPROM, variants thereof, other memory chip or cartridge, or any other tangible medium from which the processor can read and execute. In this context, the systems described herein may be implemented on or as one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like.

A set of input points or "seeds" 108 is received or generated from an initial source, such as a stochastic screen 109, or by randomly perturbing locations of seeds arranged in a regular grid, or the like, generated by the processor 104 from an input image scanned by the printing device 102, or from some other suitable source (i.e., the seeds need not come from an input image). In another embodiment, the input seeds are not random, but rather are periodic or otherwise arranged in a regular pattern, such as a grid or the like. The input points 108 and the stochastic screen 109 are stored in the memory 106. The input point seeds 108 include boundary vertices and center points, which the processor identifies. The processor 104 executes a polygon generation module 110 to generate a polygonal tiling in which boundary vertices are connected to form a plurality of tiled polygons, each of which circumscribes a at least one center point. The polygons may have any desired or predetermined number of sides, N, where N is an integer greater than or equal to 3.

The processor 104 executes a triangle tessellation module 112 to generate a triangle tessellation based on the seed locations. For instance, the input points or seeds 108 may be arranged in an irregular or non-uniform grid-like pattern, such as is shown in FIG. 2. The tessellation module 110 includes a radial sweep triangulation module 114, or any other suitable triangulation module. For instance, the radial sweep module, when executed by the processor, causes a central point of a set of points is connected to other points radially. Triangles are then formed by connecting radial edges together.

The processor 104 executes an encompassing triangle identification module 120 that identifies "encompassing" triangles in which a pixel resides on a pixel-by-pixel basis. For instance, a crossing number module 122 can be executed, which follows a ray that passes through a given pixel and identifies the triangle whose sides intersect the ray twice, once on each side of the pixel P. According to another aspect, a winding number module 124 is executed, which counts the number of times the triangle winds around the pixel. If the winding number is 0, the point is outside the triangle; otherwise, it is inside.

The processor 104 executes a distance determination module 126 that determines or calculates each pixel's distance h from its encompassing triangle's non-center side. That is, the distance h from each pixel to a non-center side of its encompassing triangle is determined or calculated. The distance determination module 126 also calculates or determines a height H for each triangle, including a height from a center vertex C to its opposite base or side (e.g., a side without a center for a vertex, but rather including only boundary vertices $V_1$, $V_2$, etc.). In this manner, two height or distance values are calculated: a pixel height, which can be identified as h, and a triangle height, which can be identified as H.

Once the two height values are determined for each pixel, the processor inputs the height values into a spot function on a pixel-by-pixel basis to determine output values that are used to generate halftone thresholds. In one example, the spot function is executed for each pixel as soon as the height values H, h are available. In another example, the spot function is executed for all pixels once all pixels' height values H, h have been determined. The processor 104 then executes a halftone module 130 that uses the spot function output values for each pixel, optionally with one or more secondary criteria or considerations such as an image pixel value for the pixel (e.g., a brightness and/or color value), to halftone an image. Image data 132 is stored in the memory 106 and may include input image data from which an input point seed grid is generated, intermediate image data that is generated at various points during the described process, output image data such as halftone image data, etc. The output image data is provided to a print module 134 that, when executed by the processor 104, generates a set of commands or instructions that are executed by the processor 104 and/or the printer 102 to print the halftone image. In another embodiment, the output halftone image is displayed graphically on a graphical user interface 136 that may be integral to the printer 102, remote but operably coupled thereto, or may reside on a computer such as the computer 30 of FIG. 1. In this manner, the system 100 can be employed to directly halftone an image or can be used to generate a sampled version of the spot function about a collection of seeds to yield a digital halftone cell that can be used to halftone an image.

The exemplary embodiments have been described with reference to the preferred embodiments. Obviously, modifications and alterations will occur to others upon reading and understanding the preceding detailed description. It is intended that the exemplary embodiments be construed as including all such modifications and alterations insofar as they come within the scope of the appended claims or the equivalents thereof.

The invention claimed is:

1. A computer-implemented method for generating a halftone image using a spot function on pixels within a polygonal tiling, comprising:
    defining polygon boundaries and centers within an input pixel array;
    generating a triangle tessellation from the defined polygon centers, and polygon vertices;
    identifying encompassing triangles, which each encompass at least one pixel;
    determining distances comprising a triangle height H and a pixel height h from a given pixel to a non-center side of the encompassing triangle in which the pixel is located;
    for each pixel, evaluating the spot function using the determined distances to generate an output spot function value for each pixel; and
    generating a halftone image using the output spot function values.

2. The method according to claim 1, wherein the polygonal tiling is at least one of:
    a quadrilateral tiling;
    a pentagonal tiling; and
    a hexagonal tiling.

3. The method according to claim 1, wherein the input pixel array is an irregular pixel array that comprises randomly-positioned input pixels.

4. The method according to claim 1, wherein the input pixel array is a periodic pixel array comprises regularly-positioned input pixels.

5. The method according to claim 1, wherein the triangle tessellation is generated using a radial sweep algorithm in which points in the input pixel array are connected radially to neighboring points iteratively until the triangle tessellation is complete.

6. The method according to claim 1, wherein identifying encompassing triangles comprises employing at least one of:
a crossing number algorithm that follows a ray that passes through the at least one pixel and identifies a triangle whose sides pass through the ray twice, once on each side of the at least one pixel; and
a winding number algorithm that counts a number of times a triangle winds around the at least one pixel.

7. The method according to claim 1, wherein the determined distances comprise the pixel height h that describes a distance from the at least one pixel to the non-center side of the encompassing triangle in which the at least one pixel is located, and the height H describes a distance from the non-center side to a vertex opposite the non-center side of the encompassing triangle, and wherein the spot function employs a normalized height h/H.

8. The method according to claim 7, wherein the spot function is defined as:

$$Q=af(h/H) \qquad (4)$$

where f is a monotonically decreasing function that controls the rate of growth along a direction of an altitude of the polygon and a is an adjustable parameter that varies a rate of growth of a dot formed at least in part by the at least one pixel.

9. The method according to claim 8, wherein:

$$f(h/H)=1-h/H.$$

10. The method according to claim 8, wherein:

$$f(h/H)=\cos(\pi(1-h/H)).$$

11. A processor configured to execute computer-executable instructions for performing the method of claim 1, the instructions being stored on a computer-readable medium.

12. A system that facilitates generating a halftone image using a spot function on pixels within a polygonal tiling, comprising:
a processor configured to:
define polygon boundaries and centers within an input pixel array;
generate a triangle tessellation from the defined polygon centers, and polygon vertices;
identify encompassing triangles, which each encompass at least one pixel;
determine distances comprising a triangle height H and a pixel height h from a given pixel to a non-center side of the encompassing triangle in which the pixel is located;
for each pixel, evaluate the spot function using the determined distances to generate an output spot function value for each pixel; and
generate a halftone image using the output spot function values; and
a printer that prints a halftone image using the output spot function values.

13. The system according to claim 12, wherein the polygonal tiling is at least one of a quadrilateral tiling, a pentagonal tiling, and a hexagonal tiling.

14. The system according to claim 12, wherein the triangle tessellation is generated using a radial sweep algorithm in which points in the input pixel array are connected radially to neighboring points iteratively until the triangle tessellation is complete.

15. The system according to claim 12, wherein identifying encompassing triangles comprises employing at least one of:
a crossing number algorithm that follows a ray that passes through the at least one pixel and identifies a triangle whose sides pass through the ray twice, once on each side of the at least one pixel; and
a winding number algorithm that counts a number of times a triangle winds around the at least one pixel.

16. The system according to claim 12, wherein the determined distances comprise the pixel height h that describes a distance from the at least one pixel the non-center side of the encompassing triangle in which the at least one pixel is located, and the height H describes a distance from the non-center side to a vertex opposite the non-center side of the encompassing triangle, and wherein the spot function employs a normalized height h/H.

17. The system according to claim 16, wherein the spot function is defined as:

$$Q=af(h/H) \qquad (4)$$

where f is a monotonically decreasing function that controls the rate of growth along a direction of an altitude of the polygon and a is an adjustable parameter that varies a rate of growth of a dot formed at least in part by the at least one pixel.

18. The system according to claim 17, wherein the function f(h/H) is defined as at least one of:

$$f(h/H)=1-h/H; \text{ and}$$

$$f(h/H)=\cos(\pi(1-h/H)).$$

19. The system according to claim 12, wherein the input pixel array is one of:
an irregular pixel array that comprises randomly-positioned input pixels; and
a periodic pixel array that comprises regularly-positioned input pixels.

20. A computer-implemented method for generating a halftone image using a spot function on pixels within a polygonal tiling, comprising:
defining polygon boundaries and centers within an input pixel array;
tessellating a set of input points in each of the defined polygons in the input pixel array;
identifying encompassing triangles each of which encompasses at least one pixel;
determining distances comprising a triangle height H, and a pixel height h from each pixel to a non-center side of the encompassing triangle in which the pixel is located;
normalizing the determined distances;
for each pixel, executing the spot function using the normalized distances to generate an output spot function value for each pixel;
generating a halftone image using the output spot function values and image pixel values for each pixel; and
printing the halftone image.

21. The method according to claim 20, wherein tessellating a set of input points further comprises:
generating a triangle tessellation using a radial sweep algorithm in which points in the input pixel array are connected radially to neighboring points iteratively until the triangle tessellation is complete;

determining whether each encompassing triangle has at most one center as a vertex; and
    if a given encompassing triangle has two center points and one initial boundary point as vertices, and if a line segment connecting the two center points is a side of only one encompassing triangle:
        adding a new boundary point at a mid-point along the line segment to sub-divide the given encompassing triangle into two smaller triangles, each of the two smaller triangles having as vertices the new boundary point, the initial boundary point, and one of the two original center points.

22. The method according to claim 20, wherein tessellating a set of input points further comprises:
    generating a triangle tessellation using a radial sweep algorithm in which points in the input pixel array are connected radially to neighboring points iteratively until the triangle tessellation is complete;
    determining whether each encompassing triangle has at most one center as a vertex; and
    if a given encompassing triangle has two center points, and if a first line segment connecting the two centers is a side of the given encompassing triangle and a second encompassing triangle, both of which having the two center points as vertices:
        identifying an initial boundary point that is the vertex of the second triangle sharing the side connecting the two center points; and
        adding a new boundary point at an intersection of the first line segment and a second line segment that joins the initial boundary point of the second encompassing triangle to a known initial boundary point of the given encompassing triangle thereby subdividing the two encompassing triangles into four triangles, each having one center point, one initial boundary point, and the new boundary point as vertices.

23. The method according to claim 20, wherein tessellating a set of input points further comprises:
    generating a triangle tessellation using a radial sweep algorithm in which points in the input pixel array are connected radially to neighboring points iteratively until the triangle tessellation is complete;
    determining whether each encompassing triangle has at most one center point as a vertex; and
    if all three vertices of a given encompassing triangle are center points:
        subdividing the encompassing triangle into three smaller triangles adding a new boundary point in the interior of the encompassing triangle, each of the three smaller triangles having two center points and one boundary point as vertices; and
        iterating subdivision step until each triangle has a single center point as a vertex, the other two vertices being boundary points.

24. The method according to claim 20, wherein the input pixel array is one of:
    an irregular pixel array that includes randomly-positioned input pixels; and
    a periodic pixel array that comprises regularly-positioned input pixels.

25. A computer-implemented method for generating a halftone image using a spot function on pixels within a polygonal tiling, comprising:
    defining polygon boundaries and centers within an input pixel array;
    generating a triangle tessellation from the defined polygon centers, and polygon vertices;
    identifying encompassing triangles, which each encompass at least one pixel;
    determining distances comprising a first triangle height $H_1$ and a first pixel height $h_1$ from a given pixel to a first center side of the encompassing triangle in which the pixel is located, and a second triangle height $H_2$ and a second pixel height $h_2$ from the given pixel to a second center side of the encompassing triangle;
    for each pixel, evaluating the spot function using the determined distances to generate an output spot function value for each pixel; and
    generating a halftone image using the output spot function values;
    wherein the spot function is defined as $Q=-(a_1\cos(\pi(2h_1/H_1)^{\gamma 1})+a_2\cos(\pi(2h_2/H_2)^{\gamma 2}))$, where $a_1$, $a_2$ are adjustable parameters that vary a rate of growth of a dot formed at least in part by the at least one pixel, and where $\gamma_1$ and $\gamma_2$ are adjustable values that control the roundness of dot sides and the sharpness of corner touch points of a dot formed at least in part by the given pixel.

* * * * *